United States Patent [19]
Handley

[11] Patent Number: 5,777,269
[45] Date of Patent: Jul. 7, 1998

[54] TERMINATION FOR A SHIELDED CABLE

[75] Inventor: James O. Handley, Thousand Oaks, Calif.

[73] Assignee: G & H Technology, Inc., Camarillo, Calif.

[21] Appl. No.: 712,934

[22] Filed: Sep. 13, 1996

[51] Int. Cl.⁶ ............................................. H02G 15/02
[52] U.S. Cl. .................................. 174/78; 174/79; 174/82
[58] Field of Search .............................. 174/74 R, 78, 174/79, 82, 103

[56] References Cited

U.S. PATENT DOCUMENTS

| | | | |
|---|---|---|---|
| 3,329,764 | 7/1967 | Tanges, Jr. | 174/74 R |
| 3,777,050 | 12/1973 | Silva | 174/78 |
| 4,090,029 | 5/1978 | Lundeberg | 174/78 X |
| 4,460,803 | 7/1984 | Piper | 174/36 |
| 4,973,794 | 11/1990 | Steele | 174/103 X |
| 5,266,744 | 11/1993 | Fitzmaurice | 174/103 |

*Primary Examiner*—Kristine L. Kincaid
*Assistant Examiner*—Marc D. Machtinger
*Attorney, Agent, or Firm*—George J. Netter

[57] ABSTRACT

A cable (10) has a plurality of conductors (12) with individual conductive shields (14) and one common shield (16) for all conductors, the outer end portions of which shields are terminated by being clampingly retained between tapered surfaces (48,52; 50,54) of the first, second and third termination rings (42,44,46).

2 Claims, 3 Drawing Sheets

5,777,269

1

TERMINATION FOR A SHIELDED CABLE

BACKGROUND

1. Background of the Invention

The present invention relates generally to a multiple conductor electrical cable for being interconnected to apparatus (e.g., plug and receptacle connector), and, more particularly, to a termination means for protecting the electrical cable and its individual conductors from undesirable external environment such as moisture, foreign particles, electrical and magnetic interference.

2. Description of Related Art

Electrical apparatus with which the present invention is most advantageously employed includes a connector having plug and receptacle parts each of which includes contacts interconnected with the cable conductors such that when the plug and receptacle are mated the individual contacts will produce a through connection for each cable wire.

Typically, these electrical connectors are exposed to environmental aspects which are detrimental to electrical circuit operation or to mechanical operation of the connector, and thus to the reliability of the connector as well as the ultimate equipment with which the cables are connected. For example, radio frequency fields, electromagnetic fields, and electromagnetic pulses (EMP) if existing in the environment can produce undesirable results and, therefore, it is desirable to screen or effectively shield the connector interior from such environmental factors. Also, moisture and foreign particles such as dirt and dust are preferably kept out of the interior of the electrical connector, and its conductors due to their deleterious effect.

Most plug and receptacle connectors when mated together have a degree of sealing at the mating faces such that access of external pollutants or unwanted environmental factors is at a minimum at that point. However, it is critically important that wherever the cable shields or conductor shields are penetrated that the shields be terminated and that also steps be taken in the immediate locality of termination to effectively seal against ingress of foreign particles, and moisture or other harsh gaseous matter.

SUMMARY OF THE INVENTION

The particular cable that is specifically and advantageously terminated by the described invention consists of a plurality of conductors having individual insulation and shielding thereover, a collective shield for all the conductors, all surrounded by a flex core over which there is provided a flexible wire braid tubing and finally an outer cylindrical tube of plastic or rubber, such as neoprene, for example. When the cable is to be interconnected to, say, an electrical connector part in accordance with the described invention, it passes through a cylindrical metal body having a ramp input outer surface and a trimmed inner end of the flex core abuts against an internal flange. The jacket and wire braid are clampingly compressed onto the body ramp by means of a compression ring and coupling nut threaded onto the body. The plurality of separate conductors enclosed within separate insulation means are passed outwardly from an opposite end of the body and extend through a first termination ring. Second and third termination rings are received onto the cable conductors, one at each side of the first termination ring, and threaded onto each other with sloping inner walls compressingly contacting end portions of the cable collective shield and individual conductor shields against the first termination ring. Finally, a metal sleeve which may be the open outer end of a connector plug or receptacle shell is threaded into the open end of the body. In this way, the internal cable conductors of a cable of the kind described are individually and collectively terminated against the access of foreign particles, moisture, EMI, RFI and EMP pollution, for example.

DESCRIPTION OF THE DRAWING

The present invention will be more particularly described in reference to the accompanying drawing in which there are provided.

DESCRIPTION OF A PREFERRED EMBODIMENT

Figure 1:
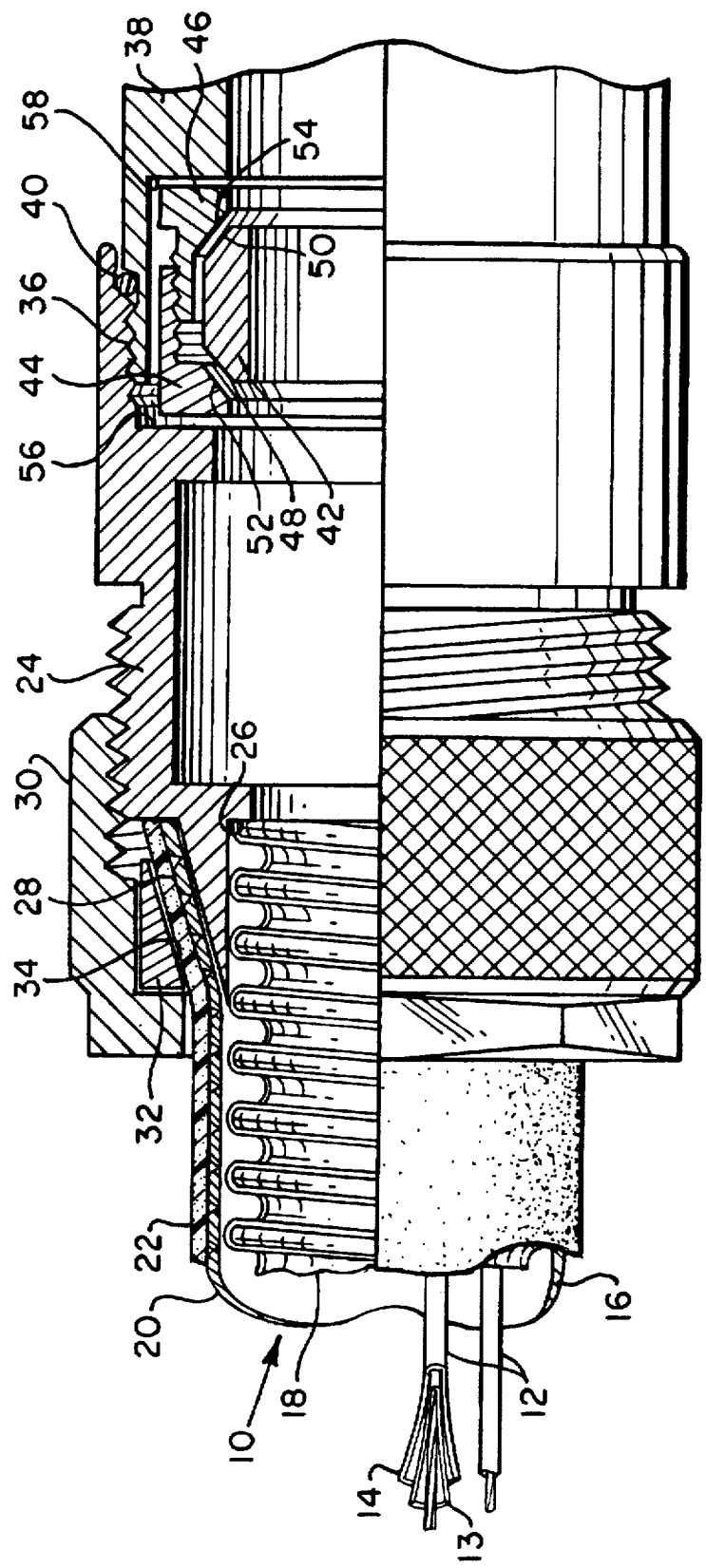
FIG. 1 is a side elevational, partially sectional view of the invention.
Figure 2:
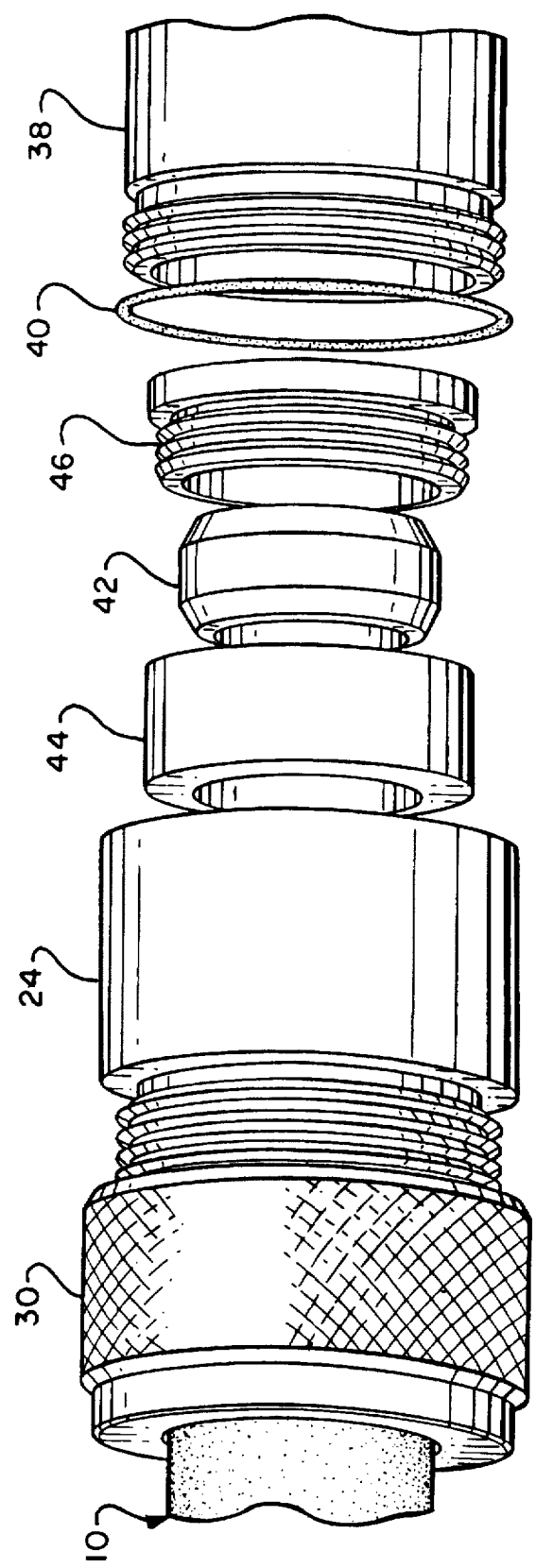
FIG. 2 is an elevational exploded view of the invention.

Turning now to the drawings and particularly FIGS. 1 and 2 thereof, a cable 10 with which the present invention is most advantageously employed is shown as including a plurality of individual conductors 12, each of which are enclosed within a separate insulative covering 13 and an individual flexible conductive shield 14. The set of conductors 12 with described individual shields are enclosed in a collective or common flexible shield 16. The shield 16 is received within an insulative flexible core 18 which is, in turn, enclosed within a flexible wire braid shield 20, and all enclosed within an outer jacket 22, the latter preferably made of a tough resilient plastic material such as neoprene, for example. The cable 10 is frequently referred to as MIL-C-24758 conduit and is particularly used where interconnected apparatus or systems need protection against both magnetic and electric interference as well as moisture, foreign particles and harmful gaseous matter.

In typical use of cable 10, the various protective cable layers, both insulative and conductive, are trimmed back to expose the conductors for specific electrical connection to apparatus, such as the contacts of a plug and receptacle electrical connector, for example. The various cable shielding layers and jacket and insulation initially provide desirable protection for the conductors and the associated apparatus to which the conductors are connected. However, when one or more of these layers are penetrated to establish connection to electrical apparatus, for example, the problem then immediately arises that external environmental interference may now make its way through at the connection points and via the penetrated cable parts to the conductors. The invention as described herein effects so-called termination of the cable closely adjacent the points at which the cable has been penetrated.

As preparatory steps for initial use, the outer end portion of the flex core wire braid and jacket are trimmed back leaving an extent of the cable conductors 12 with associated individual shields 14 and collective shielding 16 left in place. The trimmed outer end portion of the cable 10 is then passed through the bore of a generally cylindrical housing or body 24 until the outer end portion of the trimmed back flex core abuts against a housing internal shoulder 26. The outer end portion of the braid shield 20 and adjacent jacket 22 are positioned on a peripheral tapered wall 28 of the housing 24. The cable is physically secured to the housing by a coupling nut 30 with enclosed compression ring 32 being threaded on the outer end of the body 24. More particularly, the compression ring has an inner tapered surface 34 such that when the coupling nut is tightened onto the body, the compression ring tapered surface engages the intervening jacket and wire braid clamping them tightly against the housing tapered wall 28.

The outer end of the termination housing or body 24 has a threaded interior at 36 which is received upon a similarly threaded outer end of a cylindrical member such as a back shell, adapter, fitting, or connector part shell, enumerated generally as 38. Preferably an O-ring 40 of conventional construction is located between the contacting surfaces of the body 24 and the cylindrical member 38 in order to provide a first line of protection against the entry of moisture, particulate matter or other externally existing harsh gaseous matter. It is to be noted that the individual cable conductors with individual conductor shields and collective flexible shield extend beyond the body internal shoulder 26 and outwardly a substantial amount beyond the outer opening of the body 24 in order to enable conventional interconnection at some convenient point within, or beyond, the cylindrical member 38.

Figure 3:
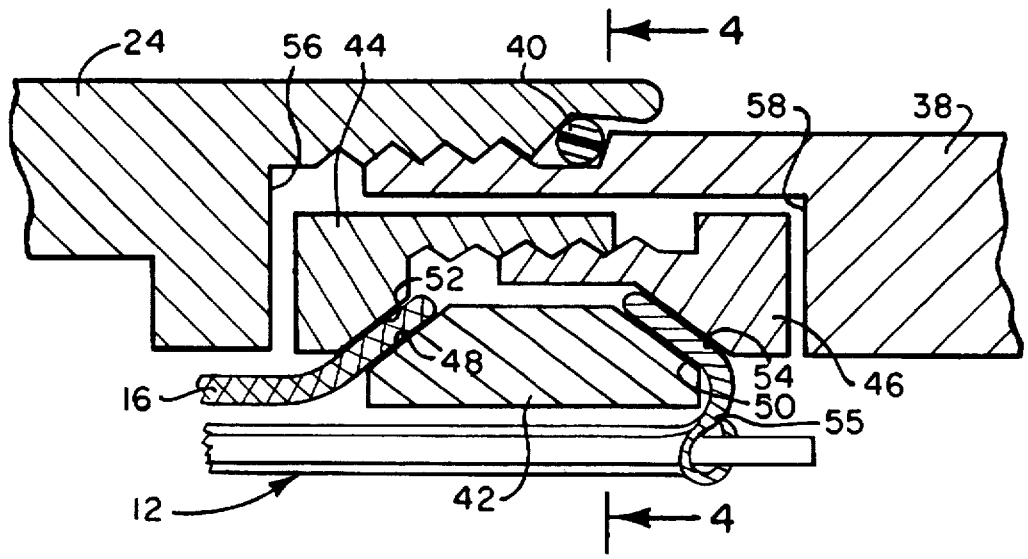
FIG. 3 is a side elevational, partially fragmentary view.
Figure 4:
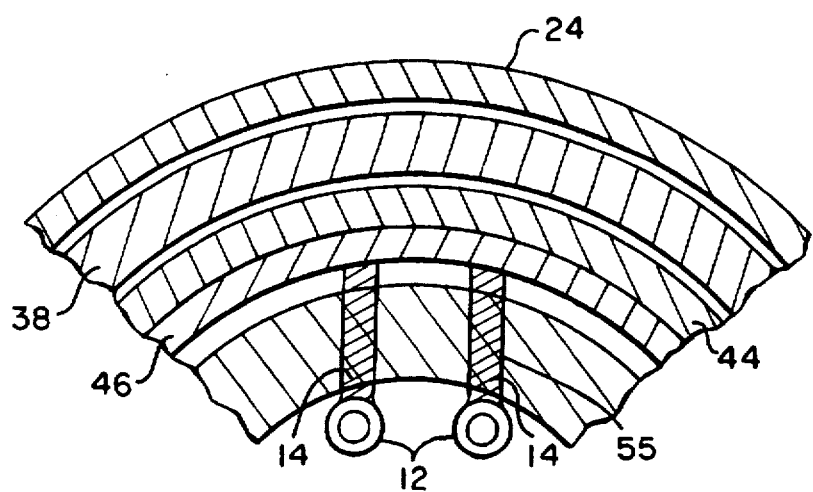
FIG. 4 is an end elevational, sectional, partially fragmentary view taken along the line 4—4 of FIG. 3.

Turning now additionally to FIGS. 3 and 4, there are seen first, second and third termination rings which are enumerated, respectively as 42, 44 and 46. The first termination ring 42 consists of a metal annulus having a smooth surfaced internal wall of a diameter permitting ready sliding relationship over the outer surface of the plurality of conductors with the common shield 16 removed. The radially outwardly circumferential peripheral edge portions are tapered forming first and second tapered surfaces 48 and 50.

The second and third termination rings 44 and 46 are generally cylindrical in shape and have complementary peripheral threaded wall portions enabling threaded receipt together. The inner walls of the second and third termination rings are each provided with circular tapered wall portions 52 and 54, respectively, which when these two rings are assembled together lie directly opposite the respective tapered surfaces 48 and 50 of the first ring.

In assembly and use, the second, first and third termination rings are received, in that order, over the cable conductor end portion having the flexible core, braided shield and jacket removed (FIGS. 1 and 3). The outermost end portion of the collective shield 16 is fitted between tapered surfaces 52 and 48. Also, the outer end portions of each individual conductor shield 55 are conveniently located between the tapered surfaces 54 and 50 (FIG. 4). Maintaining the relative location of the parts, the second and third termination rings are tightened to clamp the shields in place between the complementary tapered surfaces of the termination rings. Finally, the cylindrical member 38 is threaded to housing 24 sufficiently tightly so that respective internal wall surfaces 56 and 58 press against outer side walls of the second and third termination rings to achieve electrical grounding of the various shields and a unitary relationship.

Although the invention has been described in connection with a preferred embodiment, it is to be understood that those skilled in the appertaining arts may make changes that come within the spirit of the invention as disclosed and within the ambit of the appended claims.

What is claimed is:

1. Terminating apparatus for a plurality of cable conductors each having an individual sheathlike conductive shield and a common conductive shield within which the conductors are carried, comprising:

a first termination ring having opposite sides received about said cable conductors and underneath the common shield including first and second circular tapered surfaces;

second and third cylindrical conductive termination rings received onto the cable conductors, one at each of said opposite sides of the first termination ring, said second and third rings each having threaded parts for conjunctive assembly about said first termination ring to clampingly hold portions of the common shield and each said individual conductive shield in physical and conductive engagement with said first termination ring, said second and third termination rings each including a further internal circular tapered surface which is positioned opposed to one of the first and second tapered surfaces of the first termination ring, said further tapered surface and said one of the first and second tapered surfaces being moved toward each other as the second and third termination rings are threaded together clamping the individual shields and the common shield against the first termination ring; and a hollow termination housing and cylindrical member are each received about the second and third termination rings and include complementary threading for being engaged bringing the housing and cylindrical member into respective contact with the second and third termination rings.

2. Termination apparatus for a cable including a plurality of individual conductors each of which is encased within an insulative coating and an individual flexible woven conductive shield, the plurality of conductors with said individual shields being enclosed within a single collective flexible woven conductive shield, comprising:

a termination housing having an opening therethrough for receiving the conductors, an end portion being threaded;

a hollow cylindrical member having a threaded end portion for mating with the termination housing and having a central bore of sufficient dimensions to enable sliding receipt of the plurality of conductors without said individual and collective shields therethrough;

opposing surfaces on internal walls of the housing and member which are moved toward each other as the housing and member are threaded together;

a first annular body having a bore sufficient to enable sliding receipt of all the individual conductors therethrough located within the opening of the termination housing, a peripheral surface of the first annular body including a pair of generally flat surfaces angularly canted with respect to the circular axis of the first annular body; and second and third annular bodies located within the termination housing opening at respectively opposite sides of the first annular body bore and having threads for joining said second and third annular bodies together in clamping relation about said first annular body, the second and third angular bodies having respective complementary flat surfaces parallel to the flat surfaces of the first annular body such that the collective and individual shields are held between parallel clamping surfaces of the same annular bodies;

a turned back portion of said collective cable shield being clamped between said first and second circular bodies, further turned back portions of each individual conductive shield being clamped between said first and third annular bodies, and said opposing surfaces of the housing and cylindrical member contacting the second and third annular bodies.

* * * * *